US012675951B1

(12) United States Patent
Pagad et al.

(10) Patent No.: US 12,675,951 B1
(45) Date of Patent: Jul. 7, 2026

(54) VOXEL MESHING BASED ON OCCUPANCY

(71) Applicant: Apple Inc., Cupertino, CA (US)

(72) Inventors: Shishir Pagad, Sunnyvale, CA (US);
Hao Tang, San Jose, CA (US); **Cheng
Lu, Los Altos, CA (US); Thorsten
Gernoth**, San Francisco, CA (US)

(73) Assignee: Apple Inc., Cupertino, CA (US)

( * ) Notice: Subject to any disclaimer, the term of this
patent is extended or adjusted under 35
U.S.C. 154(b) by 127 days.

(21) Appl. No.: 18/662,202

(22) Filed: May 13, 2024

Related U.S. Application Data

(60) Provisional application No. 63/468,909, filed on May
25, 2023.

(51) Int. Cl.
G06T 17/20 (2006.01)
(52) U.S. Cl.
CPC .................................... G06T 17/20 (2013.01)
(58) Field of Classification Search
CPC ...................................................... G06T 17/20
See application file for complete search history.

(56) References Cited

U.S. PATENT DOCUMENTS

| | | | |
|---|---|---|---|
| 11,191,619 | B1 | 12/2021 | Raslambekov |
| 11,302,081 | B2 | 4/2022 | Molyneaux et al. |
| 11,364,103 | B1 | 6/2022 | Raslambekov |
| 11,394,945 | B2 | 7/2022 | Mecca et al. |
| 2005/0219245 | A1 | 10/2005 | Tao |
| 2015/0009214 | A1 | 1/2015 | Lee et al. |

| | | | |
|---|---|---|---|
| 2019/0066344 | A1 | 2/2019 | Luo et al. |
| 2021/0141061 | A1 | 5/2021 | Zweigle et al. |
| 2021/0174585 | A1 * | 6/2021 | Huber ...................... G06N 3/08 |
| 2021/0263152 | A1 * | 8/2021 | Halder ................. G05D 1/0231 |
| 2022/0254045 | A1 | 8/2022 | Boardman et al. |

(Continued)

FOREIGN PATENT DOCUMENTS

| | | |
|---|---|---|
| JP | 2018055675 | 4/2018 |

OTHER PUBLICATIONS

Ho,Bing-Jui, Sodhi, Paloma, Teixeira, Pedro; Hsiao, Ming; Kusnur,
Tushar and Kaess, Michael; "Virtual Occupancy Grid Map for
Submap-based Pose Graph SLAM and Planning in 3D Environ-
ments", 2018, pp. 1-8.

*Primary Examiner* — Kee M Tung
*Assistant Examiner* — Thang Gia Huynh
(74) *Attorney, Agent, or Firm* — Thompson Hine LLP

(57) ABSTRACT

Various implementations generate geometric representations
based on depth information detected in physical environ-
ments. For example, an example process may include
acquiring sensor data of an object in a physical environment,
the sensor data including images of a physical environment
captured via a camera on the device. The process may
further include generating a three-dimensional (3D) voxel
representation of the object based on the images. The
process may further include determining signed distance
values (SDVs) of voxel corners for voxels of the 3D voxel
representation, the SDVs representing distances to surfaces
of the object; determining occupancy data for the voxels of
the 3D voxel representation, the occupancy data correspond-
ing to whether the voxels are occupied by the object. The
process may further include generating a 3D mesh of the
object based on the SDVs of the voxel corners and the
occupancy data for the 3D voxel representation.

20 Claims, 7 Drawing Sheets

(56)          References Cited

U.S. PATENT DOCUMENTS

2023/0274465 A1 *   8/2023   Akutsu   ................... G06T 9/001
                                                                  382/232
2023/0394767 A1 *   12/2023   Ladavac   ............... G06T 17/205

* cited by examiner

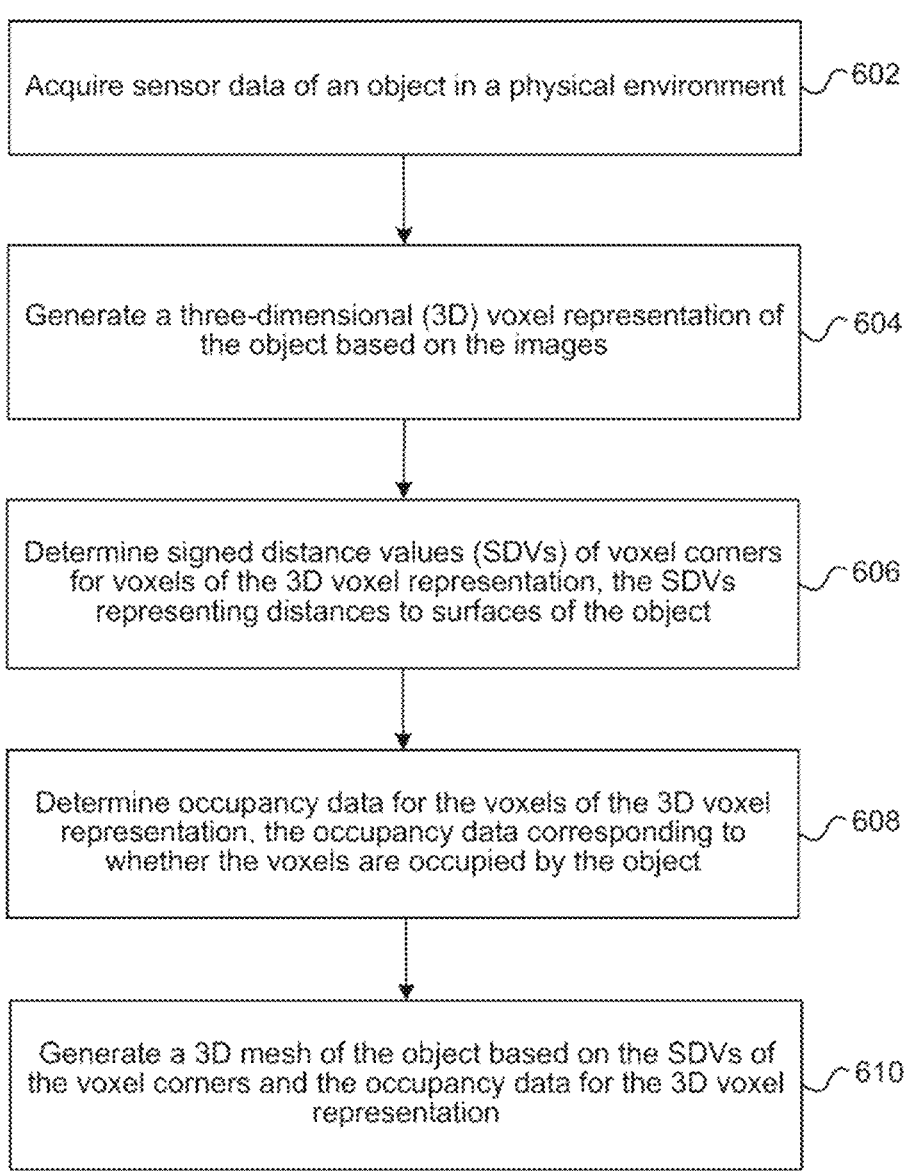

600

Acquire sensor data of an object in a physical environment — 602

Generate a three-dimensional (3D) voxel representation of the object based on the images — 604

Determine signed distance values (SDVs) of voxel corners for voxels of the 3D voxel representation, the SDVs representing distances to surfaces of the object — 606

Determine occupancy data for the voxels of the 3D voxel representation, the occupancy data corresponding to whether the voxels are occupied by the object — 608

Generate a 3D mesh of the object based on the SDVs of the voxel corners and the occupancy data for the 3D voxel representation — 610

FIG. 6

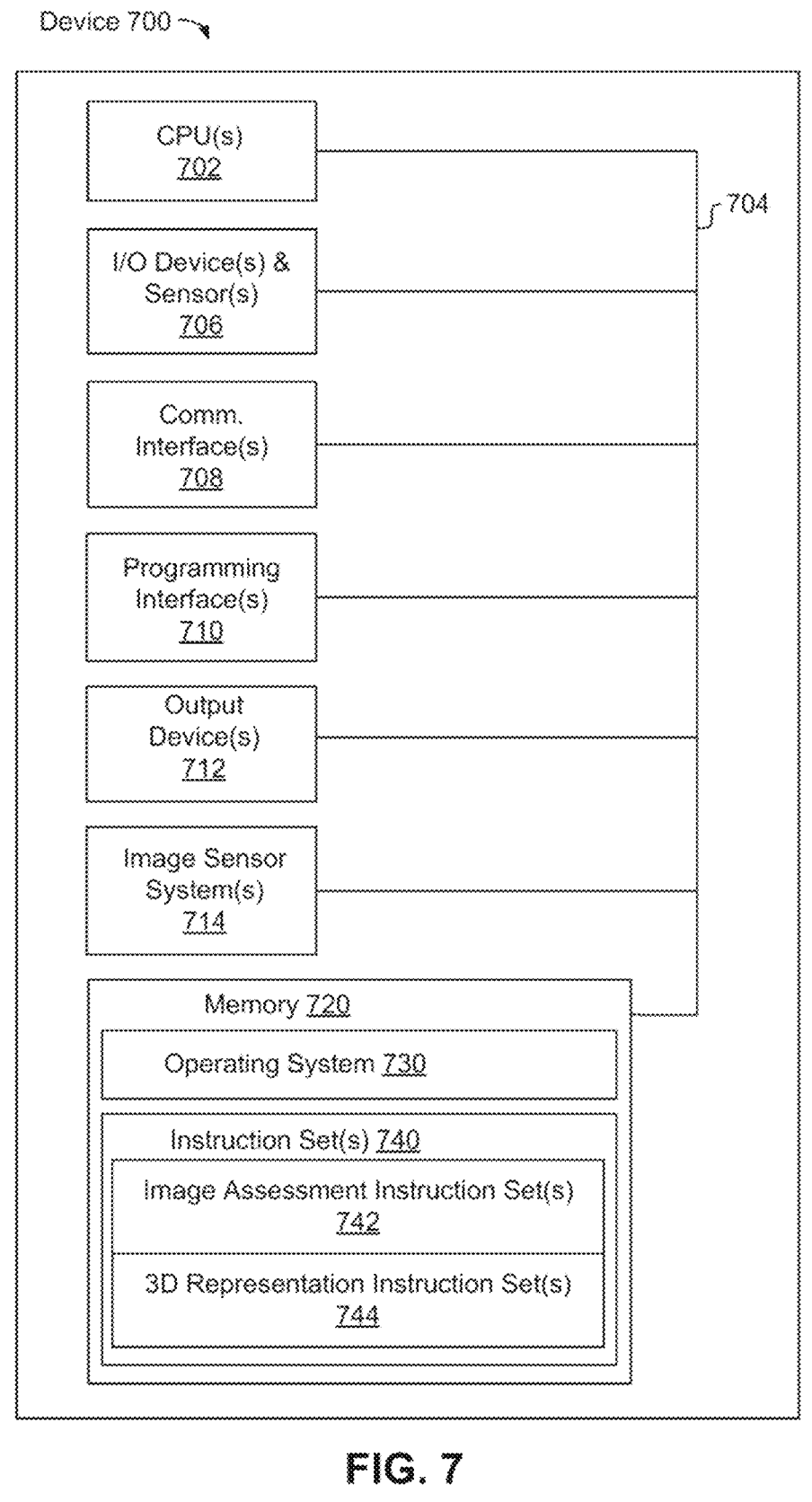

Device 700

CPU(s)
702

I/O Device(s) &
Sensor(s)
706

704

Comm.
Interface(s)
708

Programming
Interface(s)
710

Output
Device(s)
712

Image Sensor
System(s)
714

Memory 720

Operating System 730

Instruction Set(s) 740

Image Assessment Instruction Set(s)
742

3D Representation Instruction Set(s)
744

FIG. 7

VOXEL MESHING BASED ON OCCUPANCY

CROSS-REFERENCE TO RELATED APPLICATIONS

This Application claims the benefit of U.S. Provisional Application Ser. No. 63/468,909 filed May 25, 2023, which is incorporated herein in its entirety.

TECHNICAL FIELD

The present disclosure generally relates to generating three-dimensional geometric representations of physical objects, and in particular, to systems, methods, and devices that generate geometric representations based on depth information detected in physical environments.

BACKGROUND

Physical environments have been modeled (e.g., reconstructed) by generating three-dimensional (3D) meshes. These meshes represent 3D surface points and other surface characteristics of the physical environments' floors, walls, and other objects. Such reconstructions may be generated based on images and depth measurements of the physical environments, e.g., using RGB cameras and depth sensors. The reconstruction techniques may provide reconstructions using voxels to generate meshes. Voxels, as used herein, refer to volumetric pixels. Existing reconstruction techniques use voxels of a fixed size that are spaced in a regularly-spaced grid in 3D space without gaps in between the voxels. For example, such reconstruction techniques may accumulate information volumetrically using truncated signed distance functions (TSDFs) that provide signed distance values for voxels within a threshold distance of a surface in the physical environment, where the values represent the distances of such voxels to the nearest respective surfaces in the physical environment. When relatively larger voxels are used by such techniques, the techniques may fail to sufficiently represent detailed characteristics of the physical environments. In contrast, when relatively smaller voxels are used by such techniques, the techniques may yield inaccurate reconstructions due to insufficient noise filtering, and may require undesirable resource usage, e.g., requiring processing that cannot be performed in real-time or memory storage levels that are undesirable or unavailable. Accordingly, existing reconstruction techniques may fail to provide sufficiently accurate and efficient reconstructions of physical environments.

SUMMARY

Various implementations disclosed herein include devices, systems, and methods that generates a three-dimensional (3D) mesh representing the 3D shape of an object in a way that is particularly useful for thin object portions (e.g., a leaf, a book, and the like) or open-sided object interiors (e.g., a bowl, cup, mug, vase). For example, the system and methods described herein may be used for a room scanning process that may require scanning a door (e.g., a thin object) from inside and outside a room, or scanning a thin wall between adjacent rooms from both sides. The systems and methods described herein uses images from multiple viewpoints and camera pose info to create a voxel representation. The voxel representation may, for example, be based on 3D surface point data/point cloud data. The voxel representation is used to generate the 3D mesh.

In exemplary implementations, the systems and methods described herein focuses on meshing using both (a) signed distance field (SDF)-based data (e.g., identifying the distances of voxel corner points to a nearest object surface) and (b) occupancy-based data (e.g., identifying likelihoods that voxels are occupied by the object rather than being empty). For example, for regular object surfaces (e.g., normal objects with thicker depth than thin objects), the voxel corner SDF values have opposite signed SDF values (e.g., 1, −1) and thus traditional marching cubes can determine the triangular representation of the surface within the voxel based on the opposite signed values. However, for thin object surfaces captured from multiple viewpoints, the voxel corner SDF values may be inaccurate averaged values. For example, a particular corner may be given a value of 1 based on an image from one side and a value of −1 when captured from the opposite side and an average value of 0, which may confuse the traditional marching cubes determination. The method may use occupancy data to determine that a voxel should contain a mesh segment (even when average SDF corner values aren't opposites and standard marching cubes wouldn't generate a mesh segment) because the voxel is occupied, and thus that source voxel corner SDF values rather than average values should be used in the meshing.

In some implementations, source voxel corner SDF values may be used in different ways. In a first example, the SDF corner values may be assigned in a way to address the conflict (e.g., rather than averaging all values for a corner, using a subset of values from one or a few viewpoints on one side of the object). In a second example, the marching-cubes-type algorithm may be modified to use the set of all (e.g., conflicting) SDF values for a corner rather than an average value.

In some implementations, another example of using both SDF and occupancy values is by using occupancy values as a preliminary check before updating the SDF value stored in a voxel. For example, in the case of room scanning, when a user scans a shared wall from one side, a room scanning system may populate both SDF and occupancy values in the voxels and generate the mesh representing the wall. Then, when a user walks to the other room and scans the shared wall from the other side, the algorithm may recognize, based on the occupancy values, that the volume representing the wall has already been scanned and meshed, so there may not be a need to update the SDF values in the corresponding voxels. In other words, the algorithm may use the previously generated (cached) mesh from the voxels.

In general, one innovative aspect of the subject matter described in this specification can be embodied in methods that include the actions of, at a device having a processor, acquiring sensor data of an object in a physical environment, the sensor data including images of a physical environment captured via a camera on the device, generating a three-dimensional (3D) voxel representation of the object based on the images, determining signed distance values (SDVs) of voxel corners for voxels of the 3D voxel representation, the SDVs representing distances to surfaces of the object; determining occupancy data for the voxels of the 3D voxel representation, the occupancy data corresponding to whether the voxels are occupied by the object, generating a 3D mesh of the object based on the SDVs of the voxel corners and the occupancy data for the 3D voxel representation.

These and other embodiments may each optionally include one or more of the following features.

In some aspects, generating the 3D voxel representation of the object includes generating a 3D point cloud of the object based on the sensor data, and generating the 3D voxel representation based on the 3D point cloud. In some aspects, the sensor data includes depth data that is obtained using one or more depth cameras, wherein the depth data includes pixel depth values from a viewpoint and a sensor position.

In some aspects, determining the occupancy data for the voxels of the 3D voxel representation to determine whether the voxels are occupied by the object includes identifying a likelihood that each of the voxels is at least partially occupied by a portion of the object. In some aspects, determining whether the voxels are occupied by the object includes comparing the likelihood that each of the voxels is at least partially occupied by a portion of the object to an occupancy threshold.

In some aspects, generating the 3D mesh of the object includes determining whether a first voxel of the voxels of the 3D voxel representation is occupied by a portion of the object based on the occupancy data, and in response determining that the first voxel is occupied, determining that the first voxel will include a mesh segment.

In some aspects, generating the 3D mesh of the object includes determining whether a first voxel of the voxels of the 3D voxel representation is occupied by a portion of the object based on the occupancy data, and in response determining that the first voxel is occupied, determining that the first voxel will include a front mesh segment and a rear mesh segment together representing a thin portion of the object.

In some aspects, the method further includes the actions of determining a mesh segment for a first voxel, the mesh segment corresponding to a surface of the object and determined using multiple SDVs for a voxel corner of the first voxel, the multiple SDVs corresponding to sensor data from different viewpoints. In some aspects, the method further includes the actions of determining a mesh segment for a first voxel, the mesh segment corresponding to a surface of the object and determined by identifying a subset of SDVs associated with sensor data obtained from viewpoints on a side of the object, and generating the mesh segment based on the subset of SDVs.

In some aspects, the method further includes the actions of determining a mesh segment for a first voxel, the mesh segment corresponding to a surface of the object and determined by identifying a first subset of SDVs associated with sensor data obtained from a first set of viewpoints on a first side of the object, generating a first mesh segment based on the first subset of SDVs, identifying a second subset of SDVs associated with sensor data obtained from a second set of viewpoints on a second side of the object, and generating a second mesh segment based on the second subset of SDVs.

In some aspects, the method further includes the actions of determining a mesh segment for a first voxel, the mesh segment corresponding to a surface of the object and determined by providing SDVs for voxel corners of the first voxel to a marching cubes-type algorithm, the provided SDVs including multiple SDVs for at least one of the voxel corners of the first voxel, the multiple SDVs corresponding to sensor data from different viewpoints, and generating the mesh segment via the marching cubes-type algorithms, wherein the marching cubes-type algorithm accounts for the multiple SDVs in generating the mesh segment for the first voxel.

In some aspects, the method further includes the actions of determining a mesh segment for a first voxel, the mesh segment corresponding to a surface of the object and determined by providing SDVs for voxel corners of the first voxel to a marching cubes-type algorithm, the provided SDVs including multiple SDVs for at least one of the voxel corners of the first voxel, the multiple SDVs corresponding to sensor data from different viewpoints, generating a first mesh segment via the marching cubes-type algorithms, wherein the marching cubes-type algorithm accounts for the SDVs associated with viewpoints on one side of a thin portion of the object in generating the first mesh segment for the first voxel, and generating a second mesh segment via the marching cubes-type algorithms, wherein the marching cubes-type algorithm accounts for the SDVs associated with viewpoints on another side of the thin portion of the object in generating the second mesh segment for the first voxel.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart illustrating a method for generating a 3D mesh representation of an object based on images and SDVs and occupancy data of a voxel representation of the object in accordance with some implementations.

FIG. 7 is a block diagram of an electronic device of in accordance with some implementations.

Figure 1:
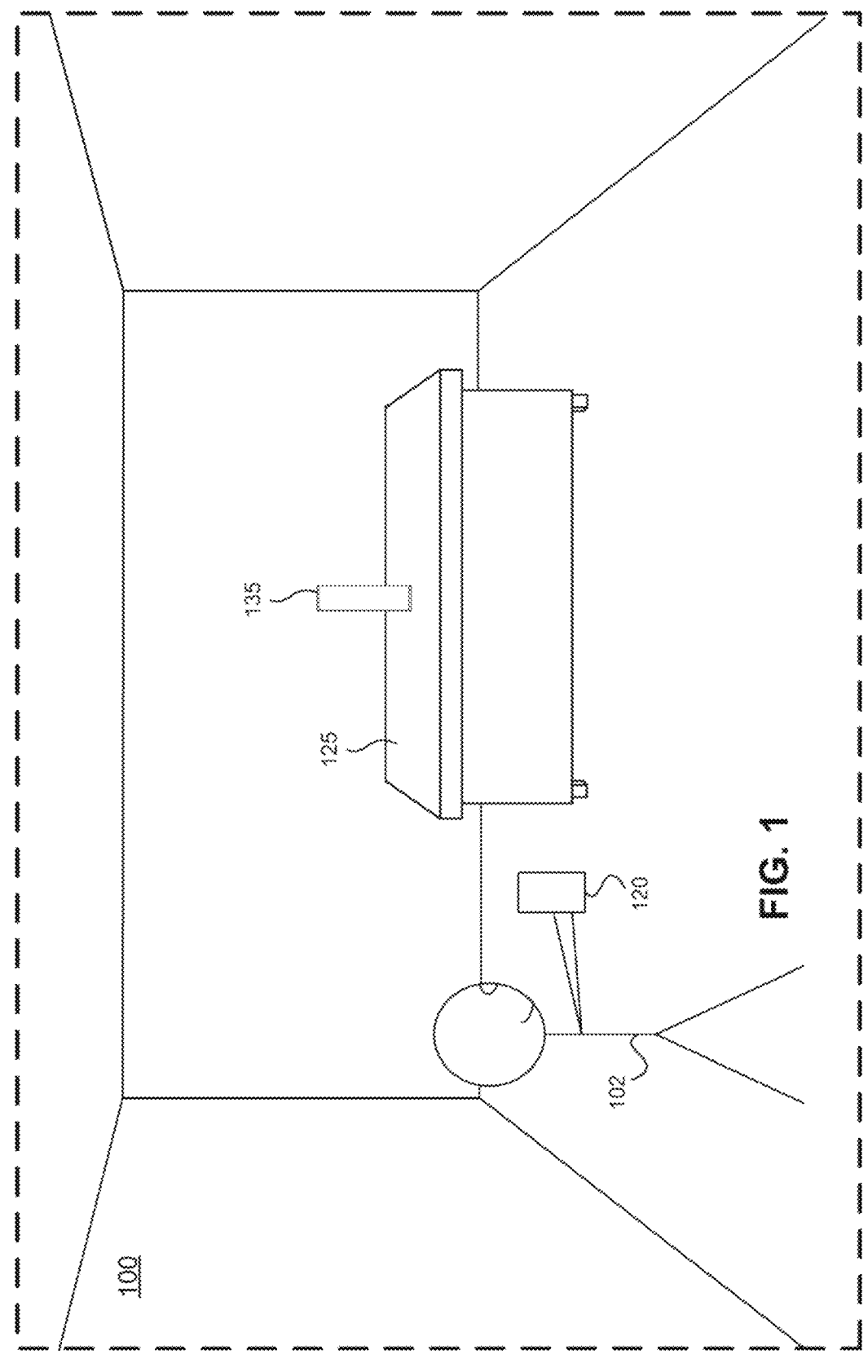
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and FIGS.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100. In this example of FIG. 1, the physical environment 100 is a room that includes a desk 125 and book 135. The electronic device 120 includes one or more cameras, microphones, depth sensors, or other sensors that can be used to capture information about and evaluate the physical environment 100 and the objects within it, as well as information about the user 102 of the electronic device 120.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may have direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

FIGS. 2 and 3 illustrate determining signed distance values (SDVs) of an area of depth data in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 200 includes a sensor 210 of a device (e.g., a camera/sensor of device 120), and a thin object (e.g., book 135) on top of the desk 125.

Figure 2B:
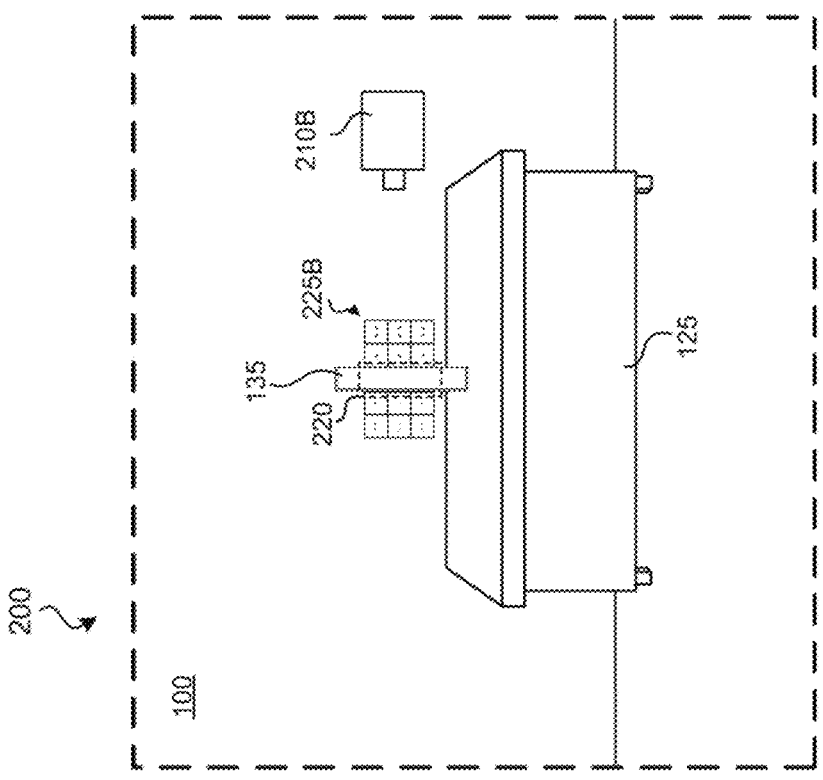
FIGS. 2A, 2B illustrate obtaining example signed distance values (SDVs) of an object by two sensors in accordance with some implementations.
Figure 2A:
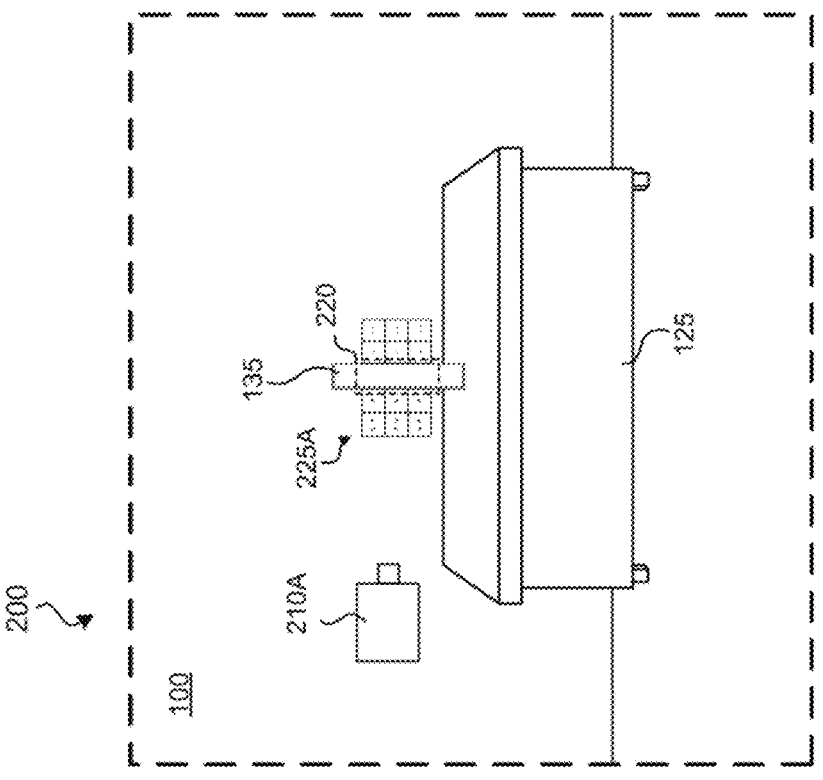

FIGS. 2A and 2B illustrate an example operating environment 200 of the physical environment 100 of FIG. 1 while determining SDVs of an area 220 of depth data of an object (e.g., book 135) from different viewpoints in accordance with some implementations. For example, sensor 210A captures image and/or depth data of an object (e.g., desk 125) from a first viewpoint, and sensor 210B captures image and/or depth data of an object (e.g., desk 125) from a second viewpoint. In the exemplary implementation, sensor 210A and sensor 210B are the same sensor 210 at two different instances of time capturing data at two different viewpoints (e.g., an opposite viewpoint from the other side of the book 135). Alternatively, sensor 210A and sensor 210 may be two or more different sensors that are capturing image and depth data for one or more objects (e.g., during a room scan). The book 125 is captured by the sensor 210 at each viewpoint within the area 220. The area 220 provides an example area that the sensor 210 captures from different (and opposite) viewpoints to determine SDV tables 225A for the viewpoint from sensor 210A and SDV table 225B for the viewpoint from sensor 210B for storing sign distance values that are further analyzed and discussed in FIGS. 3A and 3B.

Figure 3B:
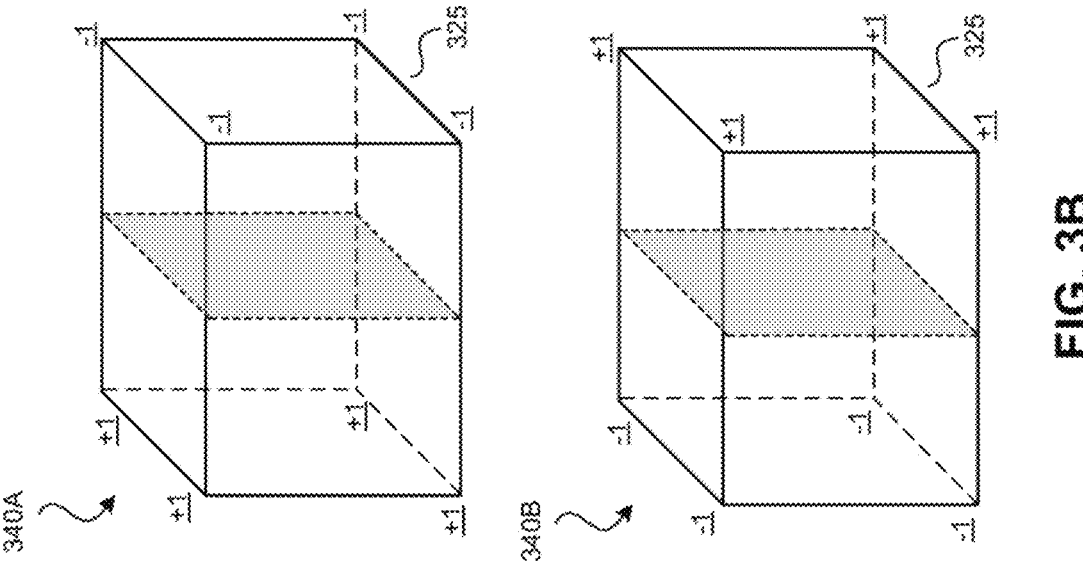
FIGS. 3A, 3B illustrate example signed distance values (SDVs) of an area of depth data in accordance with some implementations.
Figure 3A:
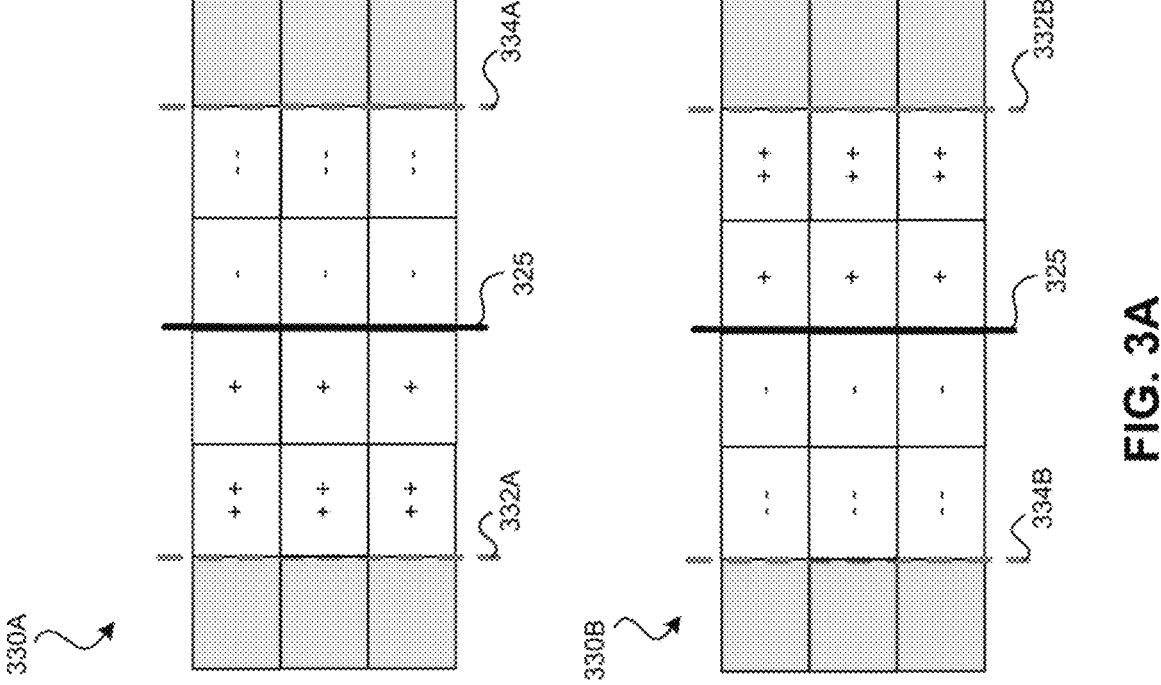

FIG. 3A illustrates two-dimensional (2D) representations 330A and 330B in a grid format for each viewpoint for sensors 210A and 210B, respectively. As shown in FIGS. 2A and 2B, the sensor 210 is facing towards an edge of the book 135 that is closest to the sensor 210. The area 220 of the object (book 135) is expanded upon at the voxel level in the 2D representations 330A and 330B in FIG. 3B for illustrative purposes to demonstrate the truncated signed distance functions (TSDF) values from the surface 325 of the book 135. A signed distance value is stored if a voxel is within the truncation threshold. For example, the first column is stored as "+" and "−" distance respectively, and a second row further away from the edge or surface 325 of the book 135 are stored as a "++" and "−−" distance respectively, each being within the positive truncation threshold 332 or negative truncation threshold 334. However, the third row values may be outside of the respective truncation threshold, thus there is no signed distance function stored. Or, in other words, the signed distance is truncated or ignored for those voxels outside of the respective truncation threshold.

FIG. 3B illustrates 3D representations 340A and 340B in a 3D format for each viewpoint for sensors 210A and 210B, respectively. As shown in FIG. 2A, the sensor 210A is angled towards a surface/edge of the book 135 that is closest to the sensor 210A. The area 220 of the book 135 is expanded upon at the voxel level in the 3D representations 340A and 340B in FIG. 3B for illustrative purposes to demonstrate the truncated signed distance functions (TSDF) values from the surface (e.g., edge of the book 135) with respect to opposing viewpoints. For example, for regular object surfaces (e.g., normal objects with thicker depth than thin objects), the voxel corner SDF values have opposite signed SDF values (e.g., 1, −1) and thus traditional marching cubes can determine the triangular representation of the surface within the voxel based on the opposite signed values. However, for thin object surfaces captured from multiple viewpoints, the voxel corner SDF values may be inaccurate averaged values. For example, as illustrated by the 3D representations 340A and 340B, a particular corner, edge, or surface of the book 135 may be given a value of 1 based on an image from one side and a value of −1 when captured from the opposite side and an average value of 0, which may confuse the traditional marching cubes determination.

Figure 4:
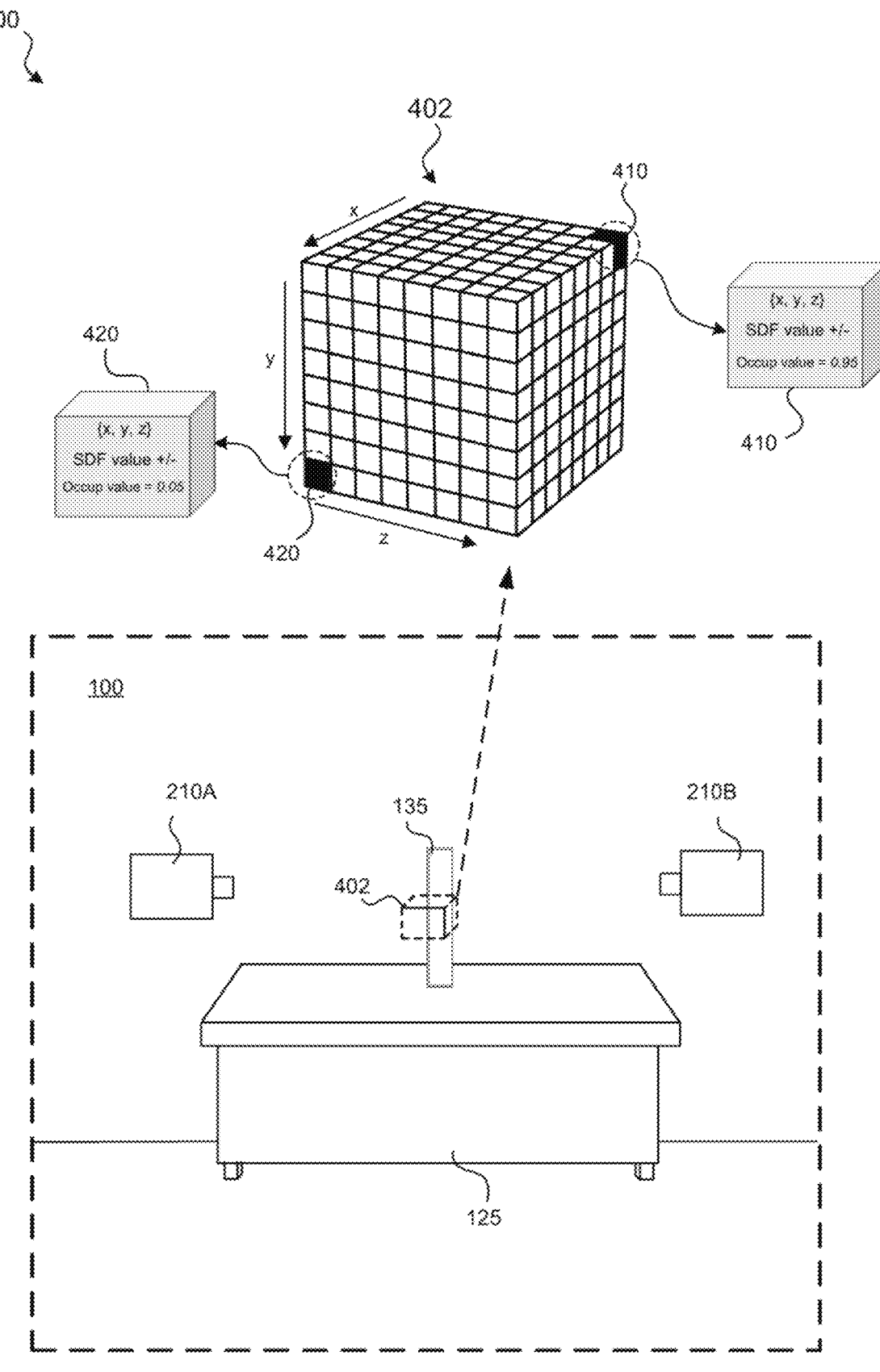
FIG. 4 illustrates example occupancy data values of an area of a voxel representation of an object in accordance with some implementations.

FIG. 4 is a block diagram illustrating an example environment 400 for determining occupancy data values of an area of a voxel representation of an object in accordance with some implementations. The example environment 400 includes an 8×8×8 orthogonal (uniform) voxel grid 402. The voxel grid 402 represents all the information in a volume by a fixed 3D grid of voxels that is pre-allocated in memory based on the images from one or more viewpoints from sensor 210. Each voxel (e.g., voxel 410, 420) may include the global (x,y,z) coordinates and the SDF values. For each voxel (e.g., voxel 410, 420), the information may be stored in buckets based on different parameters (e.g., stored information may include the world coordinates (x,y,z), SDF values, and an occupancy value). In some implementations, the information stored in the buckets may be further based on color information in combination with the world coordinates (x,y,z), SDF values, and occupancy values.

In exemplary implementations, systems and methods described herein may determine occupancy data for each voxel (e.g., voxel 410, 420) of a 3D voxel representation (e.g., voxel grid 402), where the occupancy data corresponds to whether the voxels are occupied by an object (e.g., book 135). For example, determining occupancy data for the voxels (e.g., voxel 410, 420) may include identifying likelihoods that the voxels are occupied (e.g., by an object, such as a surface or edge of the desk 125) rather than being empty space, between 0 and 1, where "1" being 100% confident the voxel is being occupied, and close to 0 means mostly empty space within the voxel. For example, as illustrated in FIG. 4, the voxel 410 is determined to very likely include a surface of the object (e.g., book 135) and the determined occupancy data is 0.95 is stored therein (e.g., 95% confident the voxel is being occupied), and voxel 420 is determined to not likely include a surface of the object and the determined occupancy data is 0.05 is stored therein (e.g., 95% confident the voxel is mostly empty space).

In some implementations, the 3D volumetric data may include distributed voxel addresses, and the stored 3D positions may be used as keys for hash table entries to provide the (x,y,z) coordinates and associated occupancy data to generate memory addresses storing voxel information. For instance, in example 3D volumetric data, each bit may be unique, and the (x,y,z) coordinates of each voxel, may be unique. In one example implementation, an algorithm implemented in a system may take advantage of the unique voxel locations and associated occupancy data in example 3D volumetric data to provide an addressing scheme which minimizes unordered or excess hash table entries.

Figure 5:
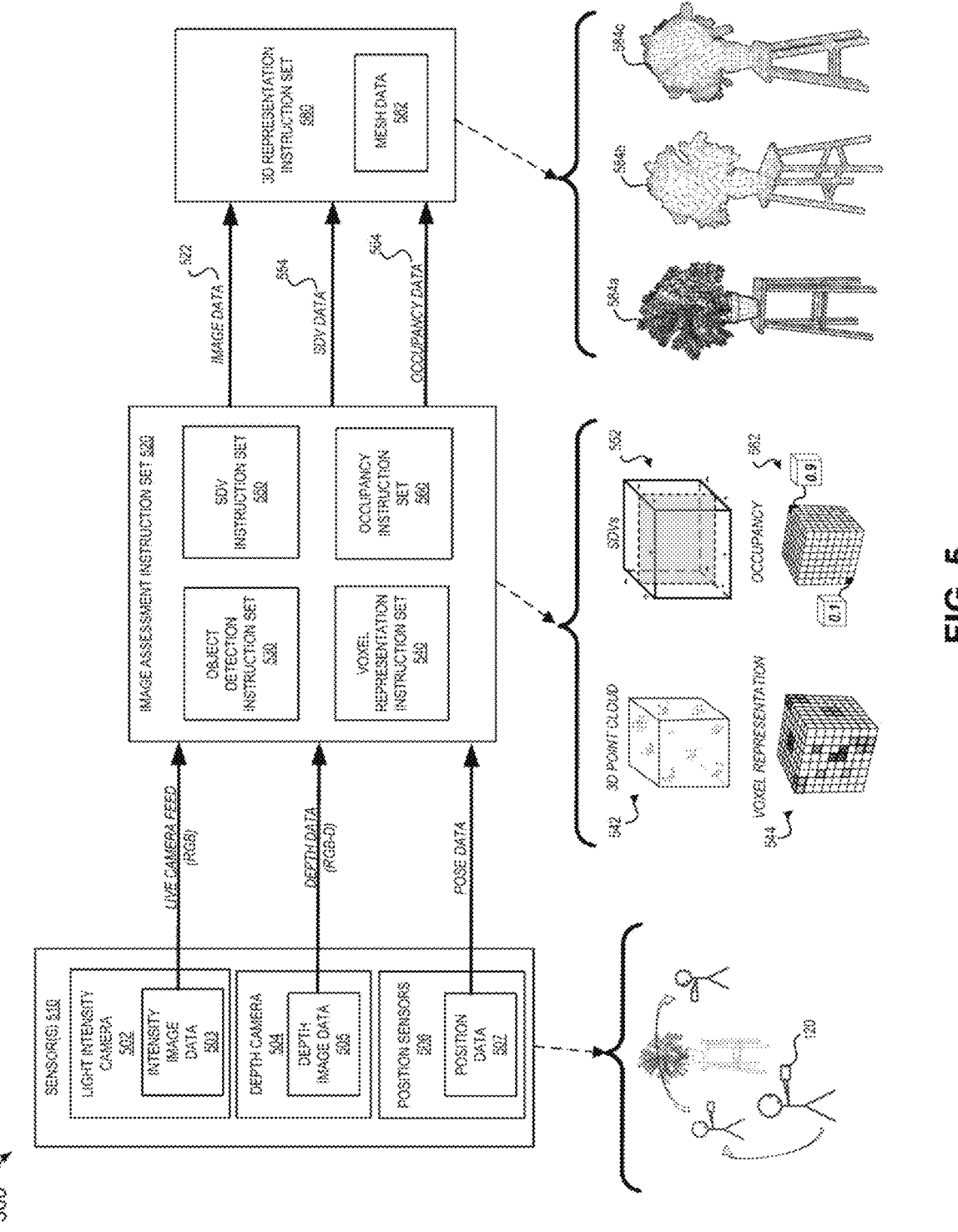
FIG. 5 is a system flow diagram of an example generation of a three-dimensional (3D) mesh representation of an object based on images and SDVs and occupancy data of a voxel representation of the object according to some implementations.

FIG. 5 is a system flow diagram of an example environment 500 in which a system can generate 3D mesh representation of an object based on images and SDVs and occupancy data of a voxel representation of the object according to some implementations. In some implementations, the system flow of the example environment 500 is performed on a device (e.g., device 120 of FIG. 1), such as a mobile device, desktop, laptop, or server device. The images of the example environment 500 can be displayed on a device (e.g., device 120 of FIG. 1) that has a screen for displaying images and/or a screen for viewing stereoscopic images such as a head-mounted device (HMD). In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires from sensors (e.g., sensors 510) light intensity image data 503 (e.g., live camera feed such as RGB from light intensity camera 502), depth image data 505 (e.g., depth image data such as RGB-D from depth camera 504), and other sources of physical environment information (e.g., camera positioning information 507 such as position and orientation data from position sensors 506) of a physical environment (e.g., the physical environment 100 of FIG. 1), assesses the images and determines image assessment data with respect to the images and the determined SDV and occupancy data during acquisition of the images (e.g., the image assessment instruction set 520), and generates 3D model data 582 of the object(s) from the image assessment data (e.g., the 3D representation instruction set 580).

In an example implementation, the environment 500 includes an image composition pipeline that acquires or obtains data (e.g., image data from image source(s) such as sensors 510) for the physical environment. Example environment 500 is an example of acquiring image sensor data (e.g., light intensity data, depth data, and position information) for a plurality of image frames. The image source(s) may include a depth camera 504 that acquires depth data 505 of the physical environment, a light intensity camera 502 (e.g., RGB camera) that acquires light intensity image data 503 (e.g., a sequence of RGB image frames), and position sensors 506 to acquire positioning information. For the positioning information 507, some implementations include a visual inertial odometry (VIO) system to determine equivalent odometry information using sequential camera images (e.g., light intensity data 503) to estimate the distance traveled. Alternatively, some implementations of the present disclosure may include a SLAM system (e.g., position sensors 506). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 500 includes an image assessment instruction set 520 that is configured with instructions executable by a processor to obtain sensor data (e.g., image data such as light intensity data, depth data, camera position information, etc.) and image assessment subset of sensor data (e.g., image data 522), and determine SDV data 554 and occupancy data 564 using one or more of the techniques disclosed herein. In some implementations, image assessment instruction set 520 includes an object detection instruction set 530 that is configured with instructions executable by a processor to analyze the image information and identify objects within the image data. For example, the object detection instruction set 530 of the image assessment instruction set 520 analyzes RGB images from a light intensity camera 502 with a sparse depth map from a depth camera 504 (e.g., time-of-flight sensor) and other sources of physical environment information (e.g., camera positioning information 507 from a camera's SLAM system, VIO, or the like such as position sensors 506) to identify objects (e.g., furniture, appliances, statues, etc.) in the sequence of light intensity images. In some implementations, the object detection instruction set 530 uses machine learning for object identification. In some implementations, the machine learning model is a neural network (e.g., an artificial neural network), decision tree, support vector machine, Bayesian network, or the like. For example, the object detection instruction set 530 uses an object detection neural network instruction set to identify objects and/or an object classification neural network to classify each type of object.

In some implementations, image assessment instruction set 520 includes a voxel representation instruction set 540 that is configured with instructions executable by a processor to analyze the image information with respect to the positioning and orientation information (e.g., position data 507) of the device motion during image acquisition. For example, the voxel representation instruction set 540 of the image assessment instruction set 520 analyzes RGB images from a light intensity camera 502 with a sparse depth map from a depth camera 504 (e.g., time-of-flight sensor) and other sources of physical environment information (e.g., camera positioning information 507 from a camera's SLAM system, VIO, or the like such as position sensors 506) to determine 3D point clouds 542 and a voxel representation 544 of a physical environment.

In some implementations, image assessment instruction set 520 includes a SDV instruction set 550 to generate SDVs 552 and SDV data 554 associated with one or more objects using one or more of the techniques disclosed herein. For example, as illustrated in FIG. 3, the SDV instruction set 550 may determine SDVs of voxel corners for voxels of a 3D voxel representation (e.g., voxel representation 544), where the SDVs represent distances to surfaces (e.g., to a nearest surface) of the object.

In some implementations, image assessment instruction set 520 includes a occupancy instruction set 560 to generate occupancy information 562 and occupancy data 564 associated with one or more objects using one or more of the techniques disclosed herein. For example, as illustrated in FIG. 4, the occupancy instruction set 560 may determine occupancy data for the voxels of the 3D voxel representation, the occupancy data corresponding to whether the voxels are occupied by the object. For example, determining occupancy data for the voxels may include identifying likelihoods that voxels are occupied rather than being empty space, between 0 and 1, "1" being 100% confident the voxel is being occupied, and close to 0 means mostly empty space within the voxel.

In an example implementation, the environment 500 further includes a 3D representation instruction set 580 that is configured with instructions executable by a processor to obtain the image assessment data (e.g., image assessment data 522) from the image assessment instruction set 520, the SDV data 554, and the occupancy data 564, and generate mesh data 582 using one or more techniques. For example, the 3D representation instruction set 580 generates 3D meshes 584a-584c for one or more points of view of the objects (e.g., desk 125 and book 135 of FIG. 1).

The generated 3D model data (e.g., mesh data 582) could be 3D mesh representations 584a-584c representing the surfaces of the objects (e.g., a potted plant on a stool) in a 3D environment using a 3D point cloud with associated semantic labels. In some implementations, the 3D model data is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 100) and/or object(s) within a room (e.g., book 135, desk 125, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the generated mesh data 582 (e.g., 3D model data) of the object is determined based on refined images, where the refined images are determined based on at least one of 3D keypoint interpolation, densification of 3D sparse point clouds associated with the images, a 2D mask corresponding to the object to remove background image pixels of the images, and/or a 3D bounding box constraint corresponding to the object to remove background image pixels of the images. In some implementations, the 3D keypoint interpolation, the densification of the 3D sparse point clouds, the 2D mask, and the 3D bounding box constraint are based on the coordinate system (e.g., pose tracking data) of the object.

In some implementations, the 3D representation instruction set 580 includes an integration instruction set that is configured with instructions executable by a processor to obtain the subset of image data (e.g., light intensity data 503, depth data 505, etc.) and positioning information (e.g., camera pose information 507 from position sensors 506) and integrate (e.g., fuse) the subset of image data using one or more known techniques. For example, the image integration instruction set receives a subset of depth image data 505 (e.g., sparse depth data) and a subset of intensity image data 503 (e.g., RGB) from the image sources (e.g., light intensity camera 502 and depth camera 504), and integrates the subset of image data and generates 3D data. The 3D data can include a dense 3D point cloud (e.g., imperfect depth maps and camera poses for a plurality of image frames around the object) that is sent to the 3D representation instruction set 580. The 3D data can also be voxelized. In some implementations, the integration instruction set is within the image assessment instruction set 520, and the image assessment data 522 is integrated by the integration instruction set before being processed by the 3D representation instruction set 580.

In some implementations, the 3D representation instruction set 580 includes a semantic segmentation instruction set that is configured with instructions executable by a processor to obtain a subset the light intensity image data (e.g., light intensity data 503) and identify and segment wall structures (wall, doors, windows, etc.) and objects (e.g., person, table, teapot, chair, vase, etc.) using one or more known techniques. For example, the segmentation instruction set receives a subset of intensity image data 503 from the image sources (e.g., light intensity camera 502), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like. In some implementations, the semantic segmentation instruction set is within the image assessment instruction set 520, and the image assessment data 522 is semantically labeled by the semantic segmentation instruction set before being processed by the 3D representation instruction set 580.

FIG. 6 is a flowchart illustrating a method 600 for generating a 3D mesh representation of an object based on images and SDVs and occupancy data of a voxel representation of the object in accordance with some implementations. In some implementations, a device such as electronic device 120 performs method 600. In some implementations, method 600 is performed on a mobile device, desktop, laptop, HMD, or server device. The method 600 is performed by processing logic, including hardware, firmware, software, or a combination thereof. In some implementations, the method 600 is performed on a processor executing code stored in a non-transitory computer-readable medium (e.g., a memory). In some implementations, the device performing the method 600 includes a processor and one or more sensors.

At block 602, the method 600 acquires sensor data (e.g., image/depth data+camera pose data) of an object in a physical environment, the sensor data including images of a physical environment captured via a camera on the device. For example, a user may move the device around an object to capture images of the object from different sides/viewpoints. In some implementations, the sensor data may include depth data and motion sensor data. In some implementations, during movement of the device, a user interface may display the acquired environment that includes the object and provide a user interface element. For example, a user interface element (e.g., an extended reality image, such as a 3D arrow or a specifically oriented circle overlaid on a live video stream) can show a user additional angles and/or perspectives to acquire the object. In some implementations, the user interface can display a preliminary 3D model of the object (e.g., a 3D mesh, 3D bounding box, etc.). For example, a picture-in-picture display of another window can display to the user a 3D model reconstruction in a live preview screen as the user is capturing live video and as the live video is streaming on the main viewing screen.

In some implementations, the sensor data signal may include RGB data, lidar-based depth data, and/or depth data. For example, sensors on a device (e.g., camera's, IMU, etc. on device 120) can capture information about the position, location, motion, pose, etc., of an object, including tracking positions of the object. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 100 around the device 120. Image sensors may acquire images of the physical environment 100 for inclusion in the image and depth information about the physical environment 100. In some implementations, a depth sensor on the device 120 determines depth values for voxels that are determined based on images acquired by an image sensor on the device 120.

In some implementations, the sensor data signal includes multiple sensor data signals. For example, one of the multiple sensor data signals may be an image signal, one of the multiple sensor data signals may be a depth signal (e.g., a structured light, a time-of-flight, or the like), one of the multiple sensor data signals may be a device motion signal (e.g., an accelerometer, an inertial measurement unit (IMU) or other tracking systems), and the like. In some implementations, the sensor data signal includes at least one of light intensity image data, depth data, user interface position data, and motion data, or a combination thereof.

At block 604, the method 600 generates a 3D voxel representation of the object based on the images. In some implementations, generating the 3D voxel representation of the object includes generating a 3D point cloud of the object based on the sensor data, and generating the 3D voxel representation based on the 3D point cloud. For example, generating a 3D voxel representation may involve generating a 3D point cloud of the object (e.g., 3D point cloud 542), and then generating a voxel representation (e.g., voxel representation 544) based on the 3D point cloud.

At block 606, the method 600 determines signed distance values (SDVs) of voxel corners for voxels of the 3D voxel representation, the SDVs representing distances to surfaces (e.g., to a nearest surface) of the object. For example, the SDVs may be associated with signed distance field (SDF) values.

At block 608, the method 600 determines occupancy data for the voxels of the 3D voxel representation, the occupancy data corresponding to whether the voxels are occupied by the object. For example, determining occupancy data for the voxels may include identifying likelihoods that voxels are occupied rather than being empty space, between 0 and 1, "1" being 100% confident the voxel is being occupied, and close to 0 means mostly empty space within the voxel.

In some implementations, determining the occupancy data for the voxels of the 3D voxel representation to determine whether the voxels are occupied by the object includes identifying a likelihood that each of the voxels is at least partially occupied by a portion of the object. For example, determining the occupancy data for the voxels of the 3D voxel representation includes identifying likelihoods that voxels are occupied rather than being empty space (e.g., between 0 and 1, where "1" being 100% confident the voxel is being occupied, and close to 0 means the voxel is mostly empty space). For example, as illustrated in FIG. 4, the voxel 410 is determined to very likely include a surface of the object and the determined occupancy data is 0.95, and voxel 420 is determined to not likely include a surface of the object and the determined occupancy data is 0.05.

In some implementations, determining whether the voxels are occupied by the object includes comparing the likelihood that each of the voxels is at least partially occupied by a portion of the object to an occupancy threshold. For example, an occupancy threshold may be determined to be at 0.8 (e.g., 80%), thus any determination the likelihood that each of the voxels is at least partially occupied by a portion of the object is great than 0.8 (e.g., 80%) than the system will proceed with the determination that the voxel is occupied when determining whether a voxel should contain a mesh segment.

In some implementations, there are two or more ways of initializing and updating occupancy values. One method of initializing and updating occupancy values may include initializing all voxels with an occupancy value of 0, indicating that the system assumes the space is empty at the beginning. As a user scans objects, the system may increase the occupancy scores of the voxels that correspond to the depth measurements. In another approach, the system may initialize all voxels with occupancy value of 0.5, indicating that the system may be unsure whether the voxel is occupied or unoccupied, and as the user scans the object, the system may ray march each depth point and decrease occupancy values of all the voxels that correspond to the free space encountered during ray marching and increase occupancy score of the voxel where the ray marching stops. In some implementations, the occupancy value needs to be greater than 0.5 (or 50%). Additionally, or alternatively, a higher occupancy value threshold may be utilized, such as 0.8 (or 80%).

At block 610, the method 600 generates a 3D mesh of the object based on the SDVs of the voxel corners and the occupancy data for the 3D voxel representation. For example, for regular object surfaces (e.g., normal objects with thicker depth), the voxel corner SDF values have opposite signed SDF values (e.g., 1, −1) and thus traditional marching cubes can determine the triangular representation of the surface within the voxel based on the opposite signed values. However, for thin object surfaces captured from multiple viewpoints, the voxel corner SDF values may be inaccurate averaged values. For example, a particular corner may be given a value of 1 based on an image from one side and a value of −1 when captured from the opposite side and an average value of 0, which may confuse the traditional marching cubes determination. The method 600 uses occupancy data to determine that a voxel should contain a mesh segment (even when average SDF corner values aren't opposites and standard marching cubes wouldn't generate a mesh segment) because the voxel is occupied, and thus that source voxel corner SDF values rather than average values should be used in the meshing.

In exemplary implementations, source voxel corner SDF values may be used in different ways. In a first example, the SDF corner values may be assigned in a way to address the conflict (e.g., rather than averaging all values for a corner, using a subset of values from one or a few viewpoints on one side of the object). In a second example, the marching-cubes-type algorithm may be modified to use the set of all (conflicting) SDF values for a corner rather than an average value.

In some implementations, generating the 3D mesh of the object includes determining whether a first voxel of the voxels of the 3D voxel representation is occupied by a portion of the object based on the occupancy data, and in response determining that the first voxel is occupied, determining that the first voxel will include a mesh segment. For example, the systems and process described herein uses the occupancy data to determine that a voxel should contain a mesh segment, even when average SDF corner values aren't opposites and standard marching cubes algorithm wouldn't generate a mesh segment, because the voxel is determined to be occupied. Therefore, the source voxel corner SDF values should be used in the meshing as opposed to averaging the values, which may negate/cancel each other.

In some implementations, generating the 3D mesh of the object includes determining whether a first voxel of the voxels of the 3D voxel representation is occupied by a portion of the object based on the occupancy data, and in response determining that the first voxel is occupied, determining that the first voxel will include a front mesh segment and a rear mesh segment together representing a thin portion of the object.

In some implementations, the method 600 may further include determining a mesh segment for a first voxel, the mesh segment corresponding to a surface of the object and determined using multiple SDVs for a voxel corner of the first voxel, the multiple SDVs corresponding to sensor data from different viewpoints.

Additionally, or alternatively, in some implementations, the method 600 may further include determining a mesh segment for a first voxel, the mesh segment corresponding to a surface of the object and determined by identifying a subset of SDVs associated with sensor data obtained from viewpoints on a side of the object, and generating the mesh segment based on the subset of SDVs. For example, rather than averaging all values for a corner, the systems and methods described herein may use a subset of values from one or a few viewpoints on one side of the object. For example, as illustrated in FIGS. 3 and 4, the systems and methods described herein may use data from the viewpoint of sensor 210A, but not from the viewpoint of sensor 210B because the average value may be zeroed out or close to zero because they are directly, or nearly directly, across from each other.

Additionally, or alternatively, in some implementations, the method 600 may further include determining a mesh segment for a first voxel, the mesh segment corresponding to a surface of the object and determined by identifying a first subset of SDVs associated with sensor data obtained from a first set of viewpoints on a first side of the object, generating a first mesh segment based on the first subset of SDVs, identifying a second subset of SDVs associated with sensor data obtained from a second set of viewpoints on a second side of the object, and generating a second mesh segment based on the second subset of SDVs.

Additionally, or alternatively, in some implementations, the method 600 may further include determining a mesh segment for a first voxel, the mesh segment corresponding to a surface of the object and determined by providing SDVs for voxel corners of the first voxel to a marching cubes-type algorithm, the provided SDVs including multiple SDVs for at least one of the voxel corners of the first voxel, the multiple SDVs corresponding to sensor data from different viewpoints, and generating the mesh segment via the marching cubes-type algorithms, wherein the marching cubes-type algorithm accounts for the multiple SDVs in generating the mesh segment for the first voxel. For example, a marching-cubes-type algorithm may be modified to use the set of all SDF values for a corner rather than an average value, even if they are conflicting values.

Additionally, or alternatively, in some implementations, the method 600 may further include determining a mesh segment for a first voxel, the mesh segment corresponding to a surface of the object and determined by providing SDVs for voxel corners of the first voxel to a marching cubes-type algorithm, the provided SDVs including multiple SDVs for at least one of the voxel corners of the first voxel, the multiple SDVs corresponding to sensor data from different viewpoints, generating a first mesh segment via the marching cubes-type algorithms, wherein the marching cubes-type algorithm accounts for the SDVs associated with viewpoints on one side of a thin portion of the object in generating the first mesh segment for the first voxel, and generating a second mesh segment via the marching cubes-type algorithms, wherein the marching cubes-type algorithm accounts for the SDVs associated with viewpoints on another side of the thin portion of the object in generating the second mesh segment for the first voxel.

FIG. 7 is a block diagram of electronic device 700. Device 700 illustrates an exemplary device configuration for electronic device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more output device(s) 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 712 include one or more displays configured to present a view of a 3D environment to the user. In some implementations, the one or more device(s) 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 700 includes a single display. In another example, the device 700 includes a display for each eye of the user.

In some implementations, the one or more output device (s) 712 include one or more audio producing devices. In some implementations, the one or more output device(s) 712 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 712 may additionally or alternatively be configured to generate haptics.

In some implementations, the one or more image sensor systems 714 are configured to obtain image data that corresponds to at least a portion of a physical environment. For example, the one or more image sensor systems 714 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of an electrical charge. In some implementations, the instruction set(s) 740 are software that is executable by the one or more processing units 702 to carry out one or more of the techniques described herein.

The instruction set(s) 740 includes an image assessment instruction set 742 and a 3D representation instruction set 744. The instruction set(s) 740 may be embodied as a single software executable or multiple software executables.

The image assessment instruction set 742 is configured with instructions executable by a processor to obtain sensor data (e.g., image data such as light intensity data, depth data, camera position information, etc.) and determine SDV data and occupancy data based on assessing the images with respect to an object based on images and tracked positions of a device during acquisition of the images using one or more of the techniques disclosed herein. For example, the image assessment instruction set 742 analyzes RGB images from a light intensity camera with a sparse depth map from a depth camera (e.g., time-of-flight sensor) and other sources of physical environment information (e.g., camera positioning information from a camera's SLAM system, VIO, or the like) to select a subset of sensor information for 3D reconstruction. In some implementations, the image assessment instruction set 742 includes separate instruction set(s), such as an object detection instruction set, a pose tracking instruction set, a mask instruction set, a voxel representation instruction set, a SDV instruction set, and an occupancy instruction set, as discussed herein.

The 3D representation instruction set 744 is configured with instructions executable by a processor to obtain the image data, SDV data, and occupancy data from the image assessment instruction set 742 and generate a 3D model using one or more techniques disclosed herein. For example, the 3D representation instruction set 744 generates a 3D model (e.g., a 3D mesh representation, a 3D point cloud with associated semantic labels, or the like) based on the analyzed image data, SDV data, and occupancy data.

Although the instruction set(s) 740 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "deter-mining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipur-pose microprocessor-based computer systems accessing stored software that programs or conFIGs. the computing system from a general-purpose computing apparatus to a specialized computing apparatus implementing one or more implementations of the present subject matter. Any suitable programming, scripting, or other type of language or com-binations of languages may be used to implement the teachings contained herein in software to be used in pro-gramming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describ-ing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the pres-ence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device having a processor:

acquiring sensor data of an object in a physical environment, the sensor data comprising images of a physical environment captured via a camera on the device;

generating a three-dimensional (3D) voxel representation of the object based on the images;

determining signed distance values (SDVs) of voxel corners for voxels of the 3D voxel representation, the SDVs representing distances to surfaces of the object;

determining occupancy data for the voxels of the 3D voxel representation, the occupancy data corresponding to whether the voxels are occupied by the object; and generating a 3D mesh of the object based on the SDVs of the voxel corners and the occupancy data for the 3D voxel representation.

2. The method of claim 1, wherein generating the 3D voxel representation of the object comprises generating a 3D point cloud of the object based on the sensor data, and generating the 3D voxel representation based on the 3D point cloud.

3. The method of claim 1, wherein determining the occupancy data for the voxels of the 3D voxel representation to determine whether the voxels are occupied by the object comprises identifying a likelihood that each of the voxels is at least partially occupied by a portion of the object.

4. The method of claim 3, wherein determining whether the voxels are occupied by the object comprises comparing the likelihood that each of the voxels is at least partially occupied by a portion of the object to an occupancy threshold.

5. The method of claim 1, wherein generating the 3D mesh of the object comprises:

determining whether a first voxel of the voxels of the 3D voxel representation is occupied by a portion of the object based on the occupancy data; and in response determining that the first voxel is occupied, determining that the first voxel will include a mesh segment.

6. The method of claim 1, wherein generating the 3D mesh of the object comprises:

determining whether a first voxel of the voxels of the 3D voxel representation is occupied by a portion of the object based on the occupancy data; and in response determining that the first voxel is occupied, determining that the first voxel will include a front mesh segment and a rear mesh segment together representing a thin portion of the object.

7. The method of claim 1, further comprising determining a mesh segment for a first voxel, the mesh segment corresponding to a surface of the object and determined using multiple SDVs for a voxel corner of the first voxel, the multiple SDVs corresponding to sensor data from different viewpoints.

8. The method of claim 1, further comprising determining a mesh segment for a first voxel, the mesh segment corresponding to a surface of the object and determined by:

identifying a subset of SDVs associated with sensor data obtained from viewpoints on a side of the object; and generating the mesh segment based on the subset of SDVs.

9. The method of claim 1, further comprising determining a mesh segment for a first voxel, the mesh segment corresponding to a surface of the object and determined by:

identifying a first subset of SDVs associated with sensor data obtained from a first set of viewpoints on a first side of the object;

generating a first mesh segment based on the first subset of SDVs;

identifying a second subset of SDVs associated with sensor data obtained from a second set of viewpoints on a second side of the object; and generating a second mesh segment based on the second subset of SDVs.

10. The method of claim 1, further comprising determining a mesh segment for a first voxel, the mesh segment corresponding to a surface of the object and determined by:

providing SDVs for voxel corners of the first voxel to a marching cubes-type algorithm, the provided SDVs comprising multiple SDVs for at least one of the voxel corners of the first voxel, the multiple SDVs corresponding to sensor data from different viewpoints; and generating the mesh segment via the marching cubes-type algorithms, wherein the marching cubes-type algorithm accounts for the multiple SDVs in generating the mesh segment for the first voxel.

11. The method of claim 1, further comprising determining a mesh segment for a first voxel, the mesh segment corresponding to a surface of the object and determined by:

providing SDVs for voxel corners of the first voxel to a marching cubes-type algorithm, the provided SDVs comprising multiple SDVs for at least one of the voxel corners of the first voxel, the multiple SDVs corresponding to sensor data from different viewpoints;

generating a first mesh segment via the marching cubes-type algorithms, wherein the marching cubes-type algorithm accounts for the SDVs associated with viewpoints on one side of a thin portion of the object in generating the first mesh segment for the first voxel; and generating a second mesh segment via the marching cubes-type algorithms, wherein the marching cubes-type algorithm accounts for the SDVs associated with viewpoints on another side of the thin portion of the object in generating the second mesh segment for the first voxel.

12. The method of claim 1, wherein the sensor data comprises depth data that is obtained using one or more depth cameras, wherein the depth data comprises pixel depth values from a viewpoint and a sensor position.

13. A device comprising:

one or more sensors;

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

acquiring sensor data of an object in a physical environment, the sensor data comprising images of a physical environment captured via a camera on the device;

generating a three-dimensional (3D) voxel representation of the object based on the images;

determining signed distance values (SDVs) of voxel corners for voxels of the 3D voxel representation, the SDVs representing distances to surfaces of the object;

determining occupancy data for the voxels of the 3D voxel representation, the occupancy data corresponding to whether the voxels are occupied by the object; and generating a 3D mesh of the object based on the SDVs of the voxel corners and the occupancy data for the 3D voxel representation.

14. The device of claim 13, wherein generating the 3D voxel representation of the object comprises generating a 3D point cloud of the object based on the sensor data, and generating the 3D voxel representation based on the 3D point cloud.

15. The device of claim 13, wherein determining the occupancy data for the voxels of the 3D voxel representation to determine whether the voxels are occupied by the object comprises identifying a likelihood that each of the voxels is at least partially occupied by a portion of the object.

16. The device of claim 15, wherein determining whether the voxels are occupied by the object comprises comparing the likelihood that each of the voxels is at least partially occupied by a portion of the object to an occupancy threshold.

17. The device of claim 13, wherein generating the 3D mesh of the object comprises:

determining whether a first voxel of the voxels of the 3D voxel representation is occupied by a portion of the object based on the occupancy data; and in response determining that the first voxel is occupied, determining that the first voxel will include a mesh segment.

18. The device of claim 13, wherein generating the 3D mesh of the object comprises:

determining whether a first voxel of the voxels of the 3D voxel representation is occupied by a portion of the object based on the occupancy data; and in response determining that the first voxel is occupied, determining that the first voxel will include a front mesh segment and a rear mesh segment together representing a thin portion of the object.

19. The device of claim 13, wherein the non-transitory computer-readable storage medium comprises program instructions that, when executed on the one or more processors, further cause the one or more processors to perform operations comprising determining a mesh segment for a first voxel, the mesh segment corresponding to a surface of the object and determined using multiple SDVs for a voxel corner of the first voxel, the multiple SDVs corresponding to sensor data from different viewpoints.

20. A non-transitory computer-readable storage medium, storing program instructions executable on a device to perform operations comprising:

acquiring sensor data of an object in a physical environment, the sensor data comprising images of a physical environment captured via a camera on the device;

generating a three-dimensional (3D) voxel representation of the object based on the images;

determining signed distance values (SDVs) of voxel corners for voxels of the 3D voxel representation, the SDVs representing distances to surfaces of the object;

determining occupancy data for the voxels of the 3D voxel representation, the occupancy data corresponding to whether the voxels are occupied by the object; and generating a 3D mesh of the object based on the SDVs of the voxel corners and the occupancy data for the 3D voxel representation.

* * * * *